US009689079B2

(12) United States Patent
Chew

(10) Patent No.: US 9,689,079 B2
(45) Date of Patent: Jun. 27, 2017

(54) COMPOSITE ELECTRODE FOR ELECTROLYTICALLY PRODUCING ALKALINE WATER, APPARATUS COMPRISING THE SAME AND USE OF THE ALKALINE WATER PRODUCED

(75) Inventor: Hwee Hong Chew, Singapore (SG)

(73) Assignee: ECOSPEC GLOBAL TECHNOLOGY PTE LTD., Singapore (SG)

( * ) Notice: Subject to any disclaimer, the term of this patent is extended or adjusted under 35 U.S.C. 154(b) by 503 days.

(21) Appl. No.: 14/362,087

(22) PCT Filed: Dec. 8, 2011

(86) PCT No.: PCT/CN2011/083672
§ 371 (c)(1),
(2), (4) Date: May 30, 2014

(87) PCT Pub. No.: WO2013/082777
PCT Pub. Date: Jun. 13, 2013

(65) Prior Publication Data
US 2014/0290482 A1 Oct. 2, 2014

(51) Int. Cl.
*C25B 11/04* (2006.01)
*C25B 15/02* (2006.01)
*C02F 1/461* (2006.01)

(52) U.S. Cl.
CPC ........ *C25B 11/0405* (2013.01); *C02F 1/4618* (2013.01); *C25B 15/02* (2013.01);
(Continued)

(58) Field of Classification Search
CPC ................ C02F 1/4618; C02F 1/46114; C02F 2001/46133; C02F 2001/4619;
(Continued)

(56) References Cited

U.S. PATENT DOCUMENTS 4,289,599 A 9/1981 Fushihara
4,406,758 A 9/1983 McIntyre et al.
(Continued)

FOREIGN PATENT DOCUMENTS

CN 101805046 8/2010
JP 56-84089 7/1981
(Continued)

OTHER PUBLICATIONS

KR2005008480A1, Title: Method for producing micro-clustered water using electrostatic induction and magnetization treatment producing long-time storable, stable and micro-clustered Inventor: Suh H D , English Abstract Date: Nov. 2005.*

*Primary Examiner* — Walter D Griffin
*Assistant Examiner* — Cameron Allen
(74) *Attorney, Agent, or Firm* — Hamre, Schumann, Mueller & Larson, P.C.

(57) ABSTRACT

The present invention provides a permanent and cost-effective composite electrode for electrolytically producing alkaline water, comprising an electrode core made of steel, a filler densely packed around the electrode core, said filler capable of creating a mildly aqueous and alkaline environment to motivate formation of a layer of magnetite over a surface of the electrode core, and a housing enclosing the filler, said housing having a pore size selected such that very low permeation of gas and liquid takes place. The invention also provides an apparatus comprising the composite electrode, and the use of the alkaline water produced by the apparatus of the invention. According to the invention, no additional undesired side products, such as toxic chlorine gas and other pollutants, are produced and discharged to the environment.

20 Claims, 2 Drawing Sheets

(52) U.S. Cl.
CPC ... *C02F 1/46114* (2013.01); *C02F 2001/4619* (2013.01); *C02F 2001/46133* (2013.01); *C02F 2201/4613* (2013.01); *C02F 2201/4617* (2013.01)

(58) Field of Classification Search
CPC ..... C02F 2201/4613; C02F 2201/4617; C25B 11/0405; C25B 15/02; C25B 11/04; C25D 11/024; C25D 11/34; C23F 13/06; C23F 13/04; C23F 13/08; C23F 13/005; C23F 2213/21; C23F 2213/31; F16L 58/00
See application file for complete search history.

(56) References Cited

U.S. PATENT DOCUMENTS

| | | | |
|---|---|---|---|
| 4,457,953 A | | 7/1984 | McIntyre et al. |
| 4,891,107 A | | 1/1990 | Dong et al. |
| 5,919,349 A | * | 7/1999 | Huber ............... C25B 3/04 204/292 |
| 6,462,935 B1 | * | 10/2002 | Shiue ............... B82Y 30/00 361/511 |
| 6,527,940 B1 | | 3/2003 | Shimamune et al. |
| 6,638,364 B2 | | 10/2003 | Harkins et al. |
| 2011/0100838 A1 | | 5/2011 | Kim et al. |

FOREIGN PATENT DOCUMENTS

| | | | |
|---|---|---|---|
| KR | 2009-0093083 | | 9/2009 |
| KR | 10-1029888 | | 4/2011 |
| WO | WO932113 A1 * | 10/1993 | ............ C04B 41/52 |
| WO | WO 2010/091553 | | 8/2010 |

* cited by examiner

COMPOSITE ELECTRODE FOR ELECTROLYTICALLY PRODUCING ALKALINE WATER, APPARATUS COMPRISING THE SAME AND USE OF THE ALKALINE WATER PRODUCED

FIELD OF THE INVENTION

The present invention relates to a composite electrode for electrolytically producing alkaline water of high pH value, and more particularly, to a composite electrode for electrolytically producing alkaline water of high pH values, creating a relatively inexpensive permanent electrode that would not lead to the generation of harmful chlorine gas during electrolysis, and an electrolytic apparatus comprising the composite electrode and requiring no separator between the anode and cathode electrodes.

BACKGROUND OF THE INVENTION

Use of a common electrolysis apparatus to increase the pH value of water is well known in the art. Generally, electrolysis is a very useful and simple process for separating chemically bonded elements and compounds, which is performed by applying an electric current across a pair of electrodes, anode and cathode, immersed in an electrolyte such as water or aqueous solution. The electrolyte is the medium to conduct electricity as it consists of free ions in solution.

One important application of electrolysis is to produce oxygen and hydrogen by electrolyzing water in an electrolytic cell having a separator arranged between the anode and the cathode. In this case, acid water is produced at the anode and alkaline water is produced at the cathode.

Alkaline water is known to find a wide range of applications. For example, alkaline water is useful for drinking, disinfecting and cleaning, depressing an abnormal intestinal fermentation and the like. Another application is that alkaline water is able to remove toxic components and the greenhouse gases $SO_2$, $NO_x$, and $CO_2$ in a flue gas, because of the high pH value and alkalinity of the alkaline water.

Alkaline water may be produced by the addition of an alkali agent such as NaOH in the water. Alternatively, ion membrane electrolysis of, for example, seawater may be used. However, due to the presence of NaCl, electrolyzing seawater or saline water always results in the generation of chlorine gas at the anode side, which is likely to re-dissolve back in the water treated, and thus decreases the pH value of the water. This consequently affects the rate or performance of generating alkaline water of high pH values. In addition, chlorine gas is known to be harmful to human health and the environment, especially to the organisms living in seawater and soil.

U.S. Pat. No. 6,527,940 discloses a production method of acid water and alkaline water in a water electrolytic cell which is partitioned by a cation-exchange membrane. However, this method requires a membrane of high cost and complicated maintenance work. In the method of this patent, the performance and rate of production of acid water and alkaline water largely depends on the condition of the membrane, and the rate of alkaline water production is reduced if leakage of the membrane used takes place.

U.S. Pat. No. 6,638,364 discloses a cleaning system and method using electrolyzed alkaline water. In this patent, chlorine gas is generated on the anode side when the alkaline water is produced in the direct electrolysis of saline water. As mentioned above, chlorine gas is harmful to the environment and thus unwanted. Another disadvantage of this patent is that the alkaline water may be neutralized because the chlorine gas is re-dissolved back in water.

U.S. Pat. Nos. 4,406,758, 4,457,953 and 4,891,107 also disclose various electrolysis apparatuses having a porous diaphragm and a hydrophobic carbon cathode. These patents are inevitably accompanied with the drawback that the operation of the apparatuses are troublesome because the amount or the rate of movement of the electrolyte solution from the anode chamber to the cathode chamber is difficult to control.

To prevent the generation of chlorine gas, magnesium may be used as the anode to produce magnesium hydroxide which will increase the pH and alkalinity of seawater without the generation of chlorine gas. However, a massive amount of magnesium is needed due to its high consumption rate, thus requiring the constant replacement of the magnesium electrode, which is not desirable.

To avoid the periodical replacement of highly consumable magnesium electrodes, one may choose to use a permanent electrode such as a platinized titanium electrode, metal oxide-coated titanium electrode and the like. Chlorine gas will however be generated when these electrodes are used. Moreover, these permanent electrodes are very expensive.

An inexpensive material is steel. The resiliency, versatility and recyclability of steel make it a very useful basic industrial material on earth today. While there are currently more than 3500 different grades of steel according to the World Steel Association, its use as an electrode in alkali water generators or electrolytic water cells has largely been met with disappointments due to the electrochemical corrosion and erosion of steel and the generation of harmful substances like chlorine and other oxidants when seawater is employed.

The chromium-containing stainless steel is more corrosion-resistant and less-consumable, but it has also been shunned by industries for use in such devices since the chromate waste additionally produced becomes a serious environmental hazard.

Therefore, there exists a need for both a new apparatus and a method for producing high pH alkaline water by use of the electrolysis process, which are inexpensive, easy and convenient to control and causes no harm to the environment and the people.

SUMMARY OF THE INVENTION

The present invention is made in consideration of the above. It is a main object of the present invention to provide a composite electrode which is practically non-consumable and cost-effective for the production of water with high pH and alkalinity values without the release of chlorine gas during the electrolysis.

Another object of the invention is to provide an apparatus for electrolytically producing alkaline water without the provision of a separator between the electrodes. The apparatus of the invention allows to eliminate the maintenance of the separator and the need to treat acid water. In the apparatus, formation of chlorine is prevented because contact between the anode surface and chloride ions present in water is greatly diminished. It is not required to add harsh chemicals like sodium hydroxide into water to increase the pH value of the water. Thus, the apparatus of the invention is environment-friendly.

In order to achieve the above objects, a first aspect of this invention provides a composite electrode for electrolytically producing alkaline water, comprising:

an electrode core made of steel, a filler densely packed around the electrode core, said filler capable of creating a mildly aqueous and alkaline environment when energized, to motivate formation of a layer of magnetite over a surface of the electrode core, and a housing enclosing the filler, said housing having a pore size selected such that very low permeation of gas and liquid takes place.

A composite material of magnetite and steel is thus created.

Carbon steel, alloy steel or mild steel may be used to make up the electrode core.

Essentially, the filler completely and tightly surrounds the electrode core and comprises one or two of alkaline earth metal compounds. The compounds may be selected from but not limited to the group consisting of magnesium oxide (MgO), magnesium carbonate ($MgCO_3$), magnesium hydroxide ($Mg(OH)_2$), calcium carbonate ($CaCO_3$), calcium hydroxide ($Ca(OH)_2$), calcium sulphate ($CaSO_4$), and gypsum-bentonite.

More preferably, the filler is made in powder form, and at least one of the compounds used as the filler are in hydrated form. In one preferred embodiment of the invention, the filler consists of a powder mixture of magnesium oxide and hydrated magnesium carbonate.

As an alternative, the filler consists of one of alkaline earth metals formed as a solid block, which is energized to generate in situ corresponding alkaline earth metal compounds mentioned above.

The low oxygen content in the alkaline pH environment contained by the housing facilitates the formation of the magnetite layer.

According to the invention, the housing may be made of alkali-resistant material, for example glass fiber woven fabric, PTFE woven fabric and polypropylene woven fabric.

In a second aspect of the invention, there is provided an apparatus for electrolytically producing alkaline water, comprising:

a water electrolytic cell containing at least one anode electrode and at least one cathode electrode in a spaced manner, without a separator arranged between said at least one anode electrode and said at least one cathode electrode, wherein the anode is formed with the composite electrode according to the invention; and a power source for applying a direct current across said at least one anode electrode and said at least one cathode electrode for causing electrolysis of water in the electrolytic cell to produce alkaline water.

In one embodiment of the invention, the apparatus further comprises a means to operably reverse polarity of said anode and cathode electrodes when the cathode is also formed with the composite electrode. The reversal of the polarity of said electrodes takes place in the timing range of 1 min to 60 mins.

The water used in the invention can be selected from the group consisting of sea water, tap water, well water and waste water.

A third aspect of the invention relates to use of the electrolytic alkaline water produced by the apparatus of the invention in removing toxic components and greenhouse gases such as $SO_2$, $NO_x$, and $CO_2$ in a flue gas.

As explained above, the composite electrode of the invention has the following advantages over the prior art:

the protective magnetite ($Fe_3O_4$) layer that is created over the surface of the electrode core very effectively prevents the corrosion of the steel, so that the composite electrode acts as a permanent electrode with high efficiency, requiring no periodical replacement of the electrode;

no additional undesired products is released to the environment when the side products of the electrolytic process, mainly from the cathode, are discharged;

no separator is used, thus there is no need for the maintenance of a separator;

it is easy and convenient to control the movement of the electrolyte solution because the whole volume of water treated by the invention is alkaline;

no chemicals are added to the water, thus consequential treatment of any added chemicals does not exist;

the formation of chlorine gas is significantly prevented because contact between the anode core surface and chloride ions is avoided.

To have a better understanding of the invention, reference is made to the following detailed description of the invention and embodiments thereof in conjunction with the accompanying drawings.

DETAILED DESCRIPTION OF THE PREFERRED EMBODIMENTS

While this invention is illustrated and described in preferred embodiments, the composite electrode and the apparatus may be produced in many different configurations, sizes, and forms.

Figure 1:
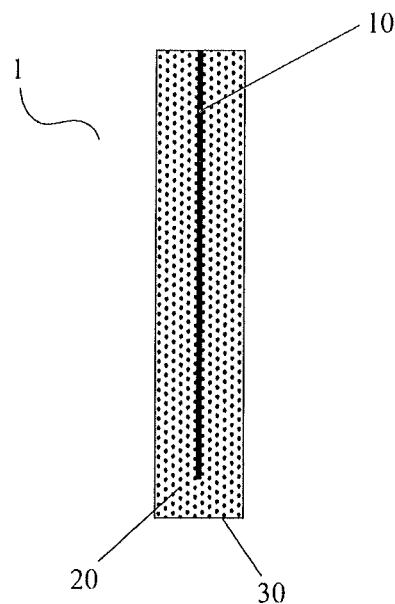
FIG. 1 is a schematic view of a composite electrode constructed in accordance with an embodiment of the invention.

Referring now to the drawings, FIG. 1 provides a composite electrode 1 constructed consistent with a preferred embodiment of the present invention. The composite electrode 1 comprises an electrode core 10, a filler 20 densely packed around the electrode core 10, and a housing 30 completely enclosing the filler 20.

The electrode core 10 may be formed in any shape and size to meet the actual industrial-specific needs. The electrode core 10 is made of steel including carbon steel, alloy steel or mild steel which is easily available and inexpensive.

The filler 20 completely and tightly surrounds the electrode core 10 to prevent the exposure of the electrode core 10 to the electrolyte. The filler 20 may comprise one or two alkaline earth metal compounds in hydrated powder form including but not limited to magnesium oxide (MgO), magnesium carbonate ($MgCO_3$), magnesium hydroxide ($Mg(OH)_2$), calcium carbonate ($CaCO_3$), calcium hydroxide ($Ca(OH)_2$), calcium sulphate ($CaSO_4$), and gypsum-bentonite, which is able to produce a mildly aqueous and alkaline environment at the pH of about 9-12 when the filler is energized. Herein the term "mildly aqueous" means the filler is simply moist or slightly wetted in a small amount of water. Generally, the hydrated forms of these compounds lose their water of hydration when they are electrically heated or energized via the electrode core 10. The compounds then dissolve in the released hydration water and hygroscopically attracted water to provide the necessary aqueous pH environment of between 9 to 12 around the surface of the electrode core 10, for the formation of a protective magnetite film ($Fe_3O_4$, according to the Pourbaix diagram for iron in water (see FIG. 3).

In this preferred embodiment, the filler 20 is a powder mixture of magnesium oxide and hydrated magnesium carbonate. This hydrated and hygroscopic powder mixture would be energized by the direct current applied to the steel electrode core 10 to create an alkaline environment at a pH of approximately 9 to 12 or higher after the release of the hydration water. Exposure of the steel surface to the alkaline environment creates the protective layer of magnetite ($Fe_3O_4$). The magnetite layer would adhere strongly onto the surface of the steel electrode core 10 to form a composite material of magnetite and steel that prevents the corrosion of the steel electrode core 10.

The thickness of the filler 20 is selected such that the water outside the housing of the composite electrode 1 has an extremely minimal chance of seeping through the compacted filler 20 to reach the steel or the created composited magnetite-steel electrode core for oxidation of chloride ions into chlorine gas. The thickness of the filler 20 depends on various factors, including but not limited to the size and shape of the electrode core 10, how dense the filler is packed, and the varied marine and land-based applications in which the composite electrode is used. The thickness may be of a few tens of millimeters to hundreds of millimeters according to the actual industrial needs.

Figure 3:
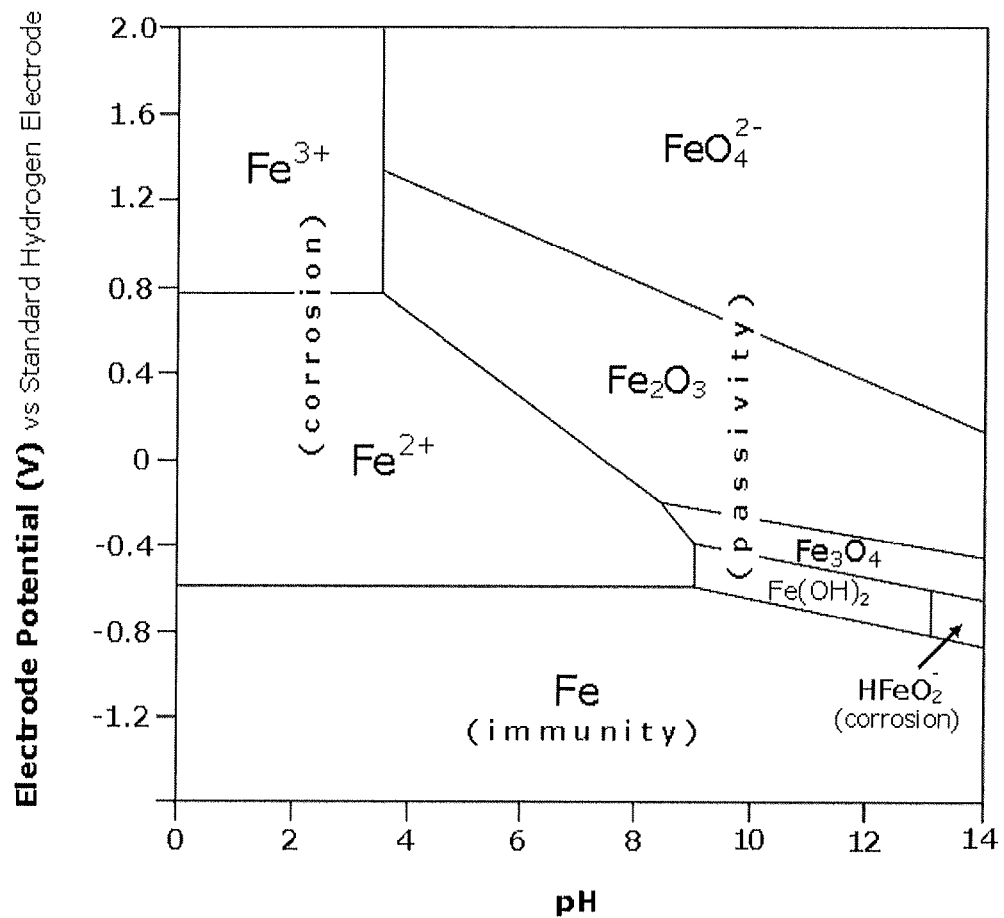
FIG. 3 is the Pourbaix Diagram for iron at 25° C.

As shown in FIG. 3, magnetite is created in an alkaline environment at pH 9 or higher where the "region of passivity" for iron or the passive state of oxidized iron is universally brought about, giving rise to its extremely low consumption rate. As a result, the steel electrode core 10 with the magnetite layer will act as a permanent composite electrode and requires no periodical replacement.

The housing 30 is in the form of a bag in this embodiment. The bag is preferably made of a strong, highly durable and alkali-resistant material, such as glass fiber woven fabric, PTFE woven fabric and polypropylene woven fabric, with a preferred pore size of about 1 to 100 micron. The bag allows for a very low, but not zero, permeation of both gas and liquid through the bag itself and the filler 20, which together provide a selective ion barrier within the composite electrode 1.

Because of the low permeability of oxygen through the bag and the filler, and the low oxygen content in the hydration water released from the mixture of magnesium oxide and hydrated magnesium carbonate, the formation of magnetite ($Fe_3O_4$) over the surface of the electrode core 10 is favoured and accelerated, which is desirable according to the invention.

In one preferred variation of the invention, the filler 20 consists of one solid block of magnesium rather than the powder mixture of magnesium oxide and hydrated magnesium carbonate. The magnesium block casted on the steel electrode core is then wrapped with the bag. When this electrode is electrolyzed in, for instance, seawater, the magnesium will corrode slowly to form a product mixture of mainly MgO and $Mg(OH)_2$ with some $MgCO_3$, all of which are held tightly in the bag. After the magnesium is fully consumed, the steel electrode core 10 is exposed to the densely-packed magnesium corrosion products, mildly aqueous, which will provide the alkaline environment for the formation of a magnetite layer on the surface of the electrode core. Such a permanent composite magnetite-steel electrode functions as well as the one formed by pre-packing the powder mixture of magnesium oxide and hydrated magnesium carbonate in the bag.

Figure 2:
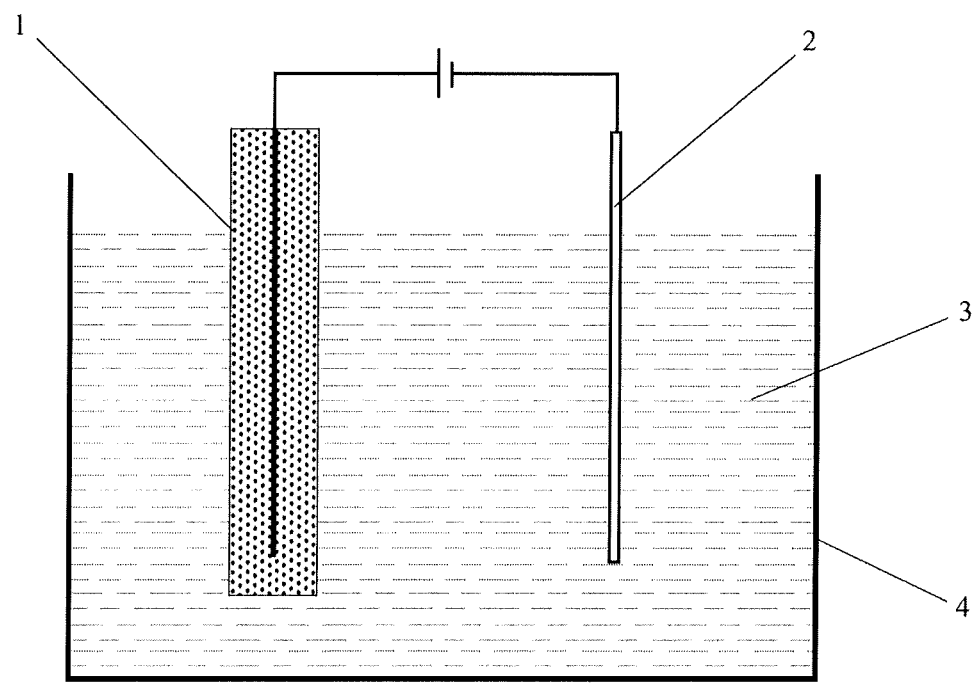
FIG. 2 is a schematic view of an apparatus for producing alkaline water in an electrolytic cell comprising the composite electrode of FIG. 1 as an anode.

FIG. 2 illustrates an apparatus for electrolytically producing alkaline water, comprising an electrolytic cell 4 containing seawater 3, an anode electrode 1 and a cathode electrode 2 in a spaced manner, for example spaced apart at a distance from 1 mm to 50 cm, which are immersed in the seawater 3. The electrolytic cell 4 may be of any size, shape and configuration. In this embodiment, the electrolytic cell 4 is made of an alkali-resistant plastic material. The anode electrode 1 is formed with the composite electrode discussed above, complete with the filler and the housing, as shown in FIG. 1. Since the chlorine gas is generated on the anode side, using the composite electrode as the anode substantially suppresses the generation of the chlorine gas. The cathode electrode 2 can be of any electrode known in the art and suitable for the electrolytic production of alkaline water, which would be within the ability of a person of ordinary skills in the art. Alternatively, the cathode electrode 2 may be formed with the same composite electrode of the invention.

As shown in FIG. 2, there is no separator or diaphragm arranged between the anode electrode 1 and the cathode electrode 2. Because of the elimination of the separator, the whole volume of the water treated by the invention is alkaline and no acid water is produced as done by the prior apparatuses with a separator, thereby the secondary treatment of acid water is avoided. The apparatus of the invention also eliminates the need for maintaining the separator, the separator of poor quality may affect the production of alkaline water.

A direct current is applied across the anode electrode 1 and the cathode electrode 2 to enable the electrolysis of water. The direct current may vary according to the different requirements in practice. For example, the direct current may range from 0.2 Amp to 10 Amp at a voltage ranging from 1.0V to 5V.

As discussed above, a layer of magnetite ($Fe_3O_4$) is formed on the surface of the steel electrode core 10. $Fe_3O_4$, stoichiometrically represented as $Fe^{(II)}Fe_2^{(III)}O_4$, is essentially a black, ferromagnetic, electrically conductive oxide containing both Fe(II) and Fe(III):

$$Fe \rightarrow Fe^{2+} + 2e^-$$

$$Fe^+ \rightarrow Fe^{3+} + e^- \quad \text{Anodic reactions:}$$

$$2H^+ + 2e^- \rightarrow H_2 \quad \text{Cathodic reaction:}$$

The cathode is where pH rise of the seawater essentially propagates from i.e. via the conversion of $H^+$ into the gas $H_2$ when a power supply of single polarity is used. A means for reversing the polarity of the electrodes periodically may be provided for the electrolytic cell 4, in the case that both the anode and the cathode are formed with the same composite electrode discussed above, to conduct the electrolysis of seawater 3 in the electrolytic cell 4. After a determined period of time, for example, from 1 min to 60 mins, the electrolysis is conducted under the same conditions, but the electrodes 1 and 2 are now used as a cathode and an anode, respectively.

The high electrical conductivity of the magnetite layer makes this a more energy-efficient alternative to other less electrically conductive material used to coat conventional seawater electrolysis electrodes.

The electrode core 10 is very well packed and compacted inside the bagged filler 20 (which is the powder mixture of magnesium oxide and hydrated magnesium carbonate) with the sufficient thickness such that the seawater hardly seeps through the compacted mixture to reach the steel or the magnetite-steel composite core. In this case, the chloride ions wound not come into contact with the anode electrode core. As a result, the generation of chlorine gas is prevented. In all the tests performed, practically no chlorine gas was ever detected during the process of electrolysis, which is a great advantage over the prior apparatuses and methods in the art.

If a small amount of the seawater penetrates through the powder mixture filler, the formation of hypochlorite (ClO⁻), an anti-bacterial material widely used for the disinfection of drinking or waste waters, can be expected under the alkaline and pH conditions.

The following half-reactions typically occur during the electrolysis of the seawater, $2H_2O(l) \rightarrow O_2(g) + 4H^+(aq) + 4e^-$    Oxidation (anode):

$2H_2O(l) + 2e^- \rightarrow H_2(g) + 2OH^-(aq)$    Reduction (cathode):

Because of the very low permeability of water through the bag 30 and the sufficient thickness of the filler 20, an extremely low level of $H_2O$ would come in contact with the surface of the magnetite-steel anode 1, which results in greatly reduced production of hydrogen ions $H^+$ at the anode 1. While at the cathode 2, $H_2$ and $OH^-$ production remains unhindered. Consequently, the whole volume of the water under treatment can reach the desired pH value and alkalinity very quickly in a most efficient and environmentally-friendly manner.

According to the invention, the bag 30 having the pore size of about 50 micron or less, together with the compacted filler 20, would still act as a very good bi-directional large ion barrier, and thus eliminates the need of using an expensive and high-maintenance ion membrane. Free H+ ions are then the main electric current carriers through the bag and slightly wetted filler. The ion gradient created across the bag also helps to keep most of the OH ions outside the bag to maintain the desired seawater alkalinity level.

To further accelerate the rise in pH and alkalinity of the water under treatment, the cathode current density can be increased to convert more acidic $H^+$ ions into $H_2$ gas, reducing the acidity and therefore increasing the pH and alkalinity level of the water.

The permanent electrode of the invention is cost-effective and highly efficient to electrolytically producing alkaline water without a separator disposed therebetween. This electrode permits no production of chlorine gas and ensures to increase the water pH and alkalinity level very quickly.

The apparatus of the invention can be used for the generation of alkaline water from seawater, freshwater or waste water, and finds a wide range of applications in the marine, shipping and offshore industries, power plant installations, waste water management and many more green, eco-friendly processes.

Experiments using the apparatus illustrated in FIG. 2 having seawater as an electrolyte have been carried out under the following conditions:
  electric current: 0.2 Amp to 10 Amp
  voltage used: 1.0 V to 5 V
  temperature: 23° C. to 50° C.

The results revealed that the pH value of the seawater having an initial pH of 6.5 to 8.5 increased to a pH of 9.5 to 12.5, in about 8 to 20 minutes of electrolysis via the apparatus, and no generation of chlorine gas was detected in more than 240 hours. This is relatively faster than the electrolysis apparatuses using inert electrodes and thus greatly decreases the time of producing the alkaline water of high pH values.

The invention makes good use of the electrolysis of water, with no chlorine gas evolved, thus there is no harm to the environment. As mentioned, it has been found that the apparatus of the invention not only increases the pH value of the water, but also increases the alkalinity of the water. Alkalinity is defined to be a measure of the buffering capacity of a solution, or the capacity of bases to neutralize acids.

Alkaline water produced by the apparatus of the invention finds a wide range of industrial applications. One of the applications is its use for removing toxic components and greenhouse gases such as $SO_2$, $NO_x$, and $CO_2$ in a flue gas. The method for removing the toxic components and greenhouse gases had been detailed in Applicant's another PCT application no. PCT/CN2009/070110, the entire disclosure of which is incorporated herein by reference. According to the invention, the obtained alkaline water has an elevated pH of 9.5 to 13.5 and increased alkalinity values, which are both beneficial in improving absorption results. When the alkaline water is used to treat the toxic components and greenhouse gases, the alkaline water after absorption has a similar pH to the seawater because of the former's increased alkalinity, which eliminates the need for a large amount of fresh seawater to dilute the water to be discharged, so that the discharged water meets environmental regulations.

As can be seen, the composite electrode and the apparatus comprising the same are very simple and convenient, environment-friendly, and enable to produce alkaline water at very low costs.

While the embodiments described herein are intended as exemplary composite electrode and apparatus, it will be appreciated by those skilled in the art that the present invention is not limited to the embodiments illustrated. Those skilled in the art will envision many other possible variations and modifications by means of the skilled person's common knowledge without departing from the scope of the invention. However, such variations and modifications should fall into the scope of this invention.

What is claimed is:

1. A composite electrode for electrolytically producing alkaline water, comprising:
   an electrode core made of steel,
   a filler densely packed around the electrode core, said filler capable of creating a mildly aqueous and alkaline environment when energized to motivate formation of a layer of magnetite over a surface of the electrode core, and
   a housing enclosing the filler, said housing having a pore size such that a reduced permeation of gas and liquid takes place.

2. The composite electrode according to claim 1, wherein the steel is carbon steel, alloy steel or mild steel.

3. The composite electrode according to claim 1, wherein the filler completely and tightly surrounds the electrode core and comprises one or two of alkaline earth metal compounds.

4. The composited electrode according to claim 3, wherein the compounds are selected from the group consisting of magnesium oxide (MgO), magnesium carbonate (MgCO3), magnesium hydroxide (Mg(OH)2), calcium carbonate (CaCO3), calcium hydroxide (Ca(OH)2), calcium sulphate (CaSO4), and gypsum-bentonite.

5. The composite electrode according to claim 3, wherein the filler is in powder form.

6. The composite electrode according to claim 3, wherein at least one of the compounds is in hydrated form.

7. The composite electrode according to claim 1, wherein the filler consists of a powder mixture of magnesium oxide and hydrated magnesium carbonate.

8. The composite electrode according to claim 1, wherein the filler consists of one of elemental alkaline earth metals, which is energized to generate in situ corresponding alkaline earth metal compounds.

9. The composite electrode according to claim 1, wherein the alkaline environment is at a pH of 9-12.

10. The composite electrode according to claim 1, wherein the housing is made of an alkali-resistant material.

11. The composite electrode according to claim 10, wherein the alkali-resistant material is selected from the group consisting of glass fiber woven fabric, PTFE woven fabric and polypropylene woven fabric.

12. The composite electrode according to claim 1, wherein an oxygen content that facilitates the formation of the magnetite layer is contained within the housing.

13. An apparatus for electrolytically producing alkaline water, comprising:
    a water electrolytic cell containing at least one anode electrode and at least one cathode electrode in a spaced manner, without a separator arranged between said at least one anode electrode and said at least one cathode electrode, wherein the anode is formed with the composite electrode according to claim 1; and
    a power source for applying a direct current across said at least one anode electrode and said at least one cathode electrode for causing electrolysis of water in the electrolytic cell to produce alkaline water.

14. The apparatus according to claim 13, wherein a device including the power source is provided to operably reverse polarity of said anode and cathode electrodes, when the cathode is also formed with the composite electrode.

15. The apparatus according to claim 14, wherein the reversal of the polarity of said electrodes takes place in the range of 1 min to 60 mins.

16. The apparatus according to claim 13, wherein said anode electrode and said cathode electrode is spaced apart at a distance from 1 mm to 50 cm.

17. A method for removing toxic components and greenhouse gases in a flue gas, comprising:
    contacting the flue gas with the electrolytic alkaline water produced by the apparatus of claim 13.

18. The apparatus according to claim 14, wherein said anode electrode and said cathode electrode is spaced apart at a distance from 1 mm to 50 cm.

19. The apparatus according to claim 15, wherein said anode electrode and said cathode electrode is spaced apart at a distance from 1 mm to 50 cm.

20. The composite electrode according to claim 4, wherein the filler is in powder form.

* * * * *